United States Patent [19]

Haynos

[11] 3,819,417

[45] June 25, 1974

[54] MECHANICALLY INTERLACED AND ELECTRICALLY INTERCONNECTED SILICON SOLAR CELLS

[75] Inventor: Joseph G. Haynos, Rockville, Md.

[73] Assignee: Communications Satellite Corporation, Washington, D.C.

[22] Filed: May 17, 1972

[21] Appl. No.: 254,120

[52] U.S. Cl. .......... 136/89, 136/134 P
[51] Int. Cl. .......... H01l 15/02
[58] Field of Search .......... 136/89, 134 P

[56] References Cited

UNITED STATES PATENTS

| | | | |
|---|---|---|---|
| 3,268,363 | 8/1966 | Steffens | 136/134 PX |
| 3,330,700 | 7/1967 | Golub et al. | 136/89 |
| 3,459,391 | 8/1969 | Haynos | 136/89 X |

*Primary Examiner*—A. B. Curtis
*Attorney, Agent, or Firm*—Sughrue, Rothwell, Mion, Zinn & Macpeak

[57] ABSTRACT

In an assembly of solar cells the individual cells are arranged in a matrix of rows and columns. The cells in each row are electrically serially interconnected, with parallel electrical connections being made between all cells in a common column. A plastic strip with a metallic pattern, such as thin lines or diamond shaped pattern, on one surface thereof is woven in an interlaced manner over and under the cells in a common row. The metallic pattern extends from the top surface of a cell which the plastic strip overlays to the bottom surface of the preceeding adjacent cell which the strip passes under. The metallic pattern is on a single surface of the plastic strip facing downward and is either directly connected to the top surface of the cells or connected to an electrode bar on the edge of the top surface of the cells. The bottom surface of the cells is connected to the metallic pattern adjacent thereto by means of a metal strip which also serves to interconnect the cells in a common column. At least one other substantially identical plastic strip with similar metallic pattern thereon is interwoven through the row of cells in the opposite manner to the first plastic strip.

9 Claims, 12 Drawing Figures

MECHANICALLY INTERLACED AND ELECTRICALLY INTERCONNECTED SILICON SOLAR CELLS

BACKGROUND OF THE INVENTION

The invention is in the field of solar cell assemblies and in particular is a flexible assembly which provides mechanical and electrical interconnection of individual solar cells.

The prior art method of assembling solar cells to create a flexible solar cell array is to interconnect the cells electrically in a series - parallel matrix by means of expandable metal interconnectors, each of which extends between adjacent columns of solar cells connecting the top edge of the cells in one column to the bottom edge of the cells in the preceeding column. The mechanical interconnections provided by the metal interconnectors are undesirable features since the interconnections are not sufficiently flexible and therefore stresses caused by thermal expansion and the vibrational environment are transmitted through the interconnectors. Failure can occur at the cell-interconnector interface. In many solar cell assemblies the entire matrix is attached to a flexible substrate by means of an adhesive for the purpose of rolling up or folding the array. However, with the prior art metal interconnectors this puts additional strain on the interconnectors. Furthermore, whenever the cells are subjected to any thermal excursion, the plastic substrate and adhesive which connects the matrix to the substrate will stretch or shrink more than the solar cell matrix since the thermal coefficients of expansion of the plastic and adhesive are greater than that of the solar cell matrix. This creates a severe amount of stress on the solar cell interconnectors.

SUMMARY OF THE INVENTION

In accordance with the present invention a flexible solar cell assembly is provided in which the mechanical interconnection of the solar cells in a row is provided by a plurality of flexible non-conducting strips interlaced or woven among the cells in the row. At least two strips are woven in opposite manner so that if one strip goes over one cell and under the next, the other strip goes under the first cell and over the next. Serial electrical interconnection is provided by metallic patterns which are formed on one surface of the flexible strips.

BRIEF DESCRIPTION OF THE DRAWINGS

FIG. 3 shows a top view, FIG. 4 shows a prospective view, FIG. 6 shows a side view, and FIG. 5 shows an end view.

DETAILED DESCRIPTION OF THE INVENTION

Figure 1:
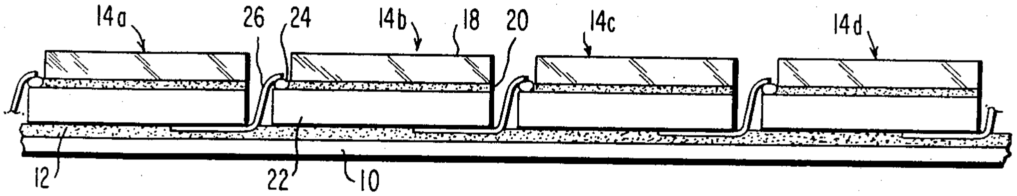
FIG. 1 PRIOR ART
FIGS. 1 and 2 represent respectively a side view and top view of the prior art solar cell array.
Figure 2:
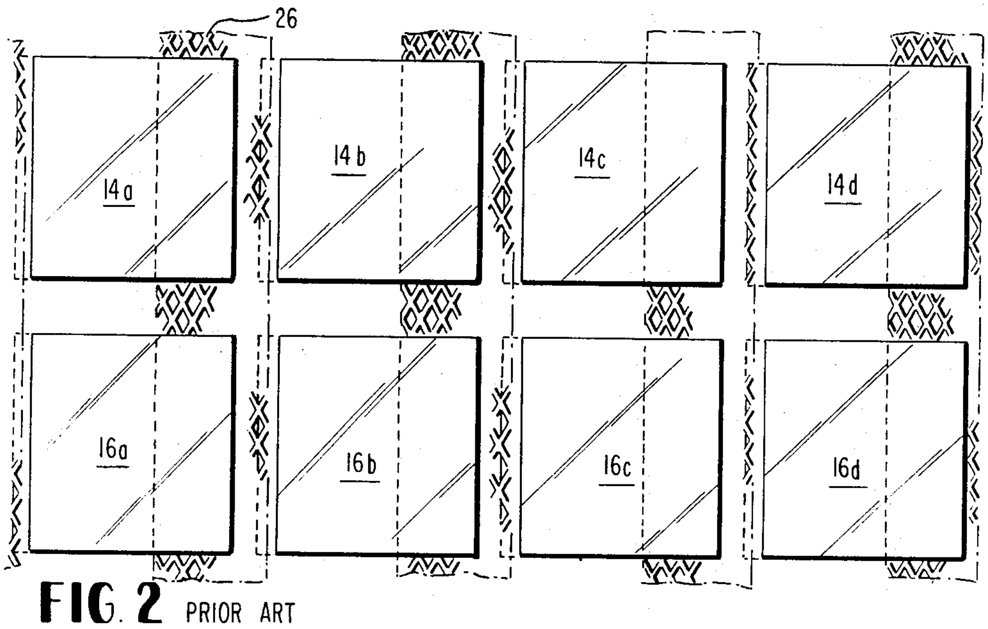
FIG. 2 PRIOR ART
Figure 11A:
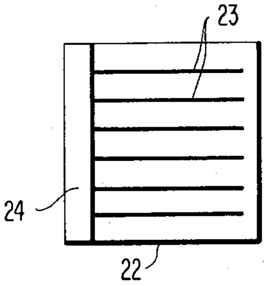
FIGS. 11*a* and 11*b* illustrate examples of the conductive pattern of the front surfaces of solar cells which may be used with the first and second embodiments respectively.

Referring to FIGS. 1 and 2 which show a prior art solar cell array in side view and top view, respectively, the individual cells are shown at 14*a* through 14*d* and 16*a* through 16*d*. Although only two rows and four columns of cells are illustrated, it will be understood that in a practical embodiment the array comprises additional rows and columns of cells. Each individual unit, for example 14*b*, comprises a semi-conductor solar cell 22, which most typically is a silicon solar cell but which may be other types of semi-conductor solar cells, a glass filter 18 and an adhesive 24 joining the glass filter to the top surface of the solar cell 22. A bar electrode 24 is at one edge of the top surface of the solar cell 22. Typically, six thin metallic fingers extend from the electrode bar 24 across the top surface of the solar cell 22 to make electrical contact with the top surface. An example of a typical conductive pattern on the front surface of each of the solar cells 22 is illustrated in FIG. 11*a* wherein conductive bar 24 is electrically connected to the thin electrically conductive fingers 23 which have been laid down on the surface by known techniques. Also it is typical for the bottom surface of cell 22 to be coated with a metal electrode.

The solar cells in each row are serially interconnected by electrically connecting the top surface of each cell to the bottom surface of the preceeding cell. It should be recognized that one cell does not preceed an adjacent cell of the same row in the sense of some ordered priority. However, the term "preceeding" is used in a relative sense to distinguish the two cells which are adjacent to a given cell in a common row. The preceeding adjacent cell has its underside electrically connected to the top surface of said given cell whereas the succeeding adjacent cell has its top side electrically connected to the underside of said given cell. Parallel connection is made by electrically interconnecting the bottom surfaces of all cells in the same column. The serial parallel electrical connection in the prior art array is made by expanded metallic connectors 26 which contact the electrode bar 24 at one end and the bottom surface of the preceeding cell in the same row at the other end. The entire matrix is typically adhered to a flexible substrate 10, such as plastic material, by means of adhesive 12. The deficiencies of the prior art array are described in the background section above.

Figure 3:
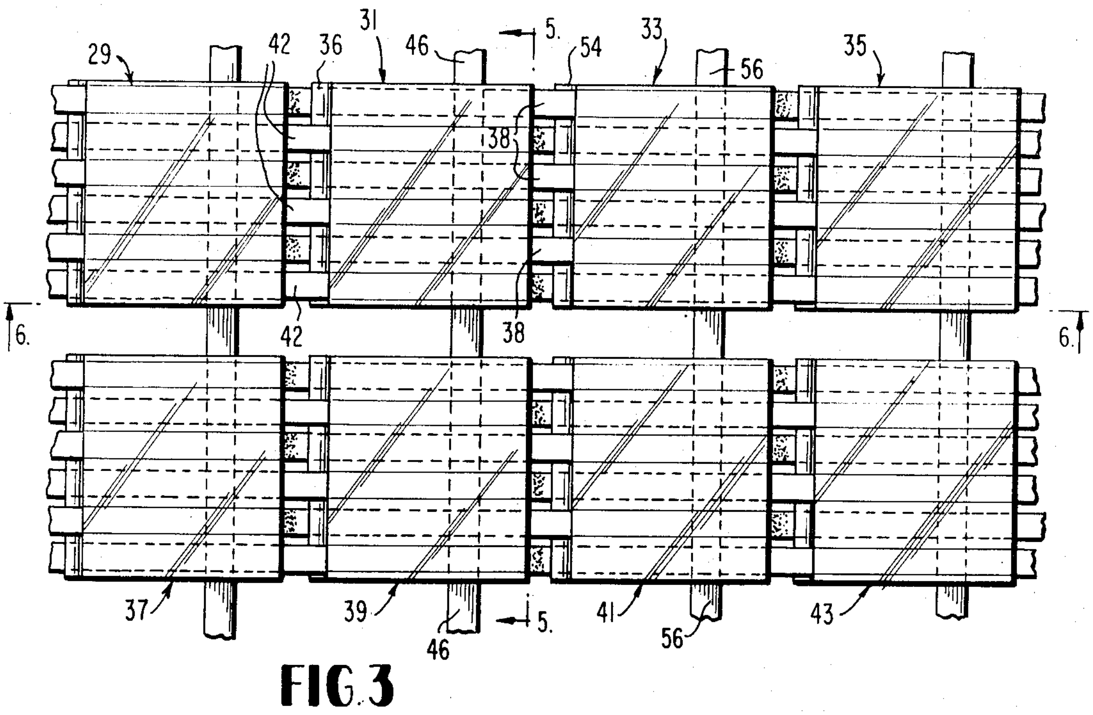
FIGS. 3 through 6 illustrate various views of a first embodiment of the invention.

A first embodiment showing the flexible array in accordance with the present invention is illustrated in FIGS. 3 through 6. The solar cell surface pattern is assumed to be as shown in FIG. 11*a*, but it will be apparent to any one of ordinary skill in the art that cells having other conductive patterns in their surfaces can also be used. In FIG. 3, which is a top view, there is shown a portion of an array comprising two rows and four columns of individual units. The units 29, 31, 33 and 35 comprise one row and the units 37, 39, 41 and 43 comprise a second row. As more readily seen in FIGS. 4 and 6, a plurality of thin non-conducting plastic strips, 38, 42, such as Mylar, are woven in an interlaced manner through a row of cells. For example, strips 38 go under the silicon solar cell 30 of unit 31 and over the adjacent silicon solar cell 48 of unit 33 whereas strips 42 go over silicon solar cell 30 and under silicon solar cell 48. Although a total of six non-conducting flexible strips per row is illustrated, it will be apparent that a greater or lesser number is well within the scope of this invention. It is necessary, however, that there be at least two strips per row woven in reverse or opposite manner. This ensures that every cell has at least one strip on its upper surface and one strip on its bottom surface.

Figures 4, 5, 6, 7:
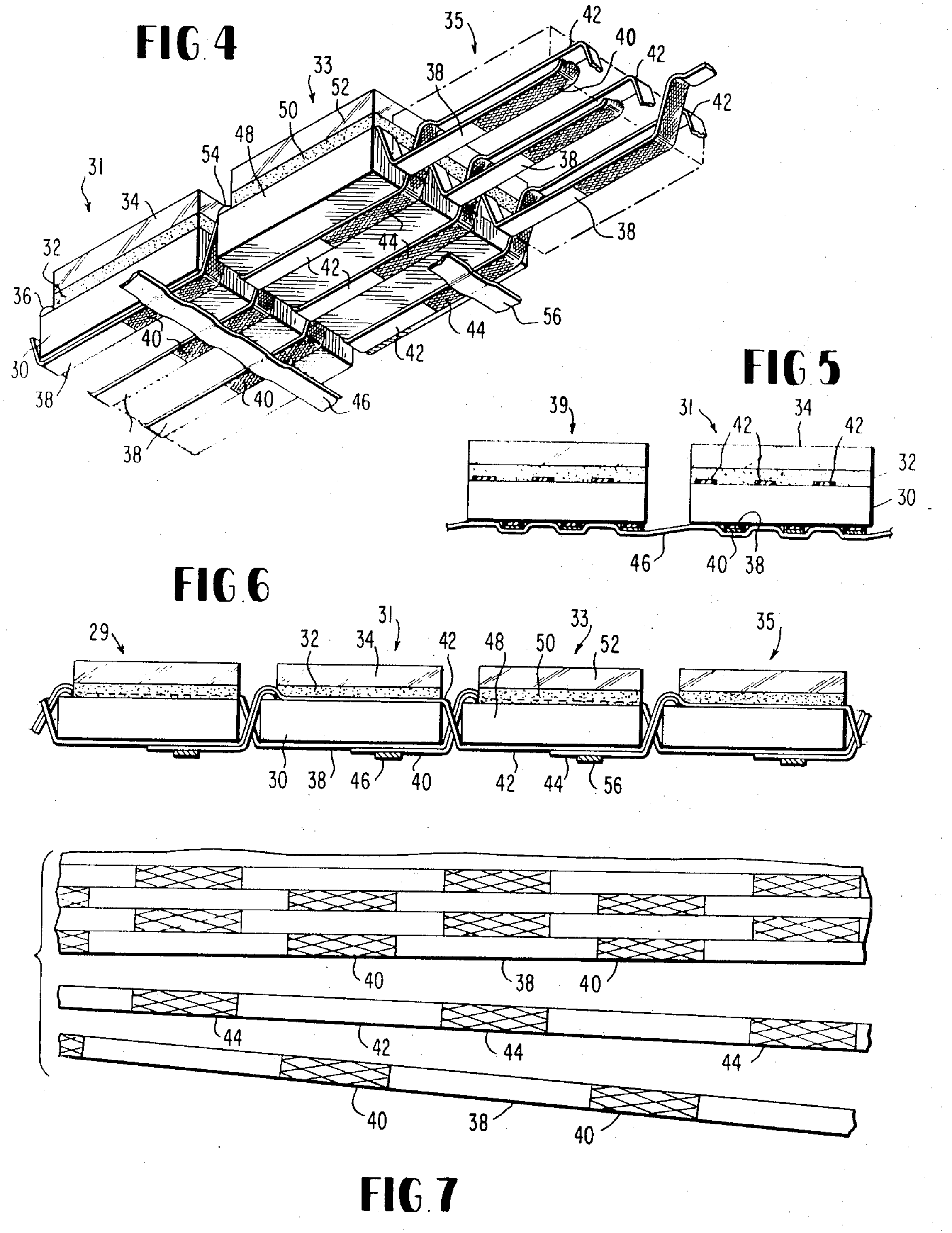
FIG. 7 illustrates one type of metallic pattern which may be formed on plastic strips for use in the first embodiment.

The strips may be formed from a large sheet of flexible non-conducting material as illustrated in FIG. 7 and cut into the desired width. Before cutting, regions of metallic patterns 40 and 44, are formed in a manner to provide a plurality of regions, 40, 44, on each individual strip. Each metallic region is electrically conducting from end to end and separated from the adjacent metallic region by a portion of the non-conducting strip having no metallic pattern thereon. Although the particular metallic pattern shown in FIG. 7 is diamond-shaped, other patterns such as straight thin lines may be formed. The metallic patterns may be formed by any conventional method. One method is to electrodeposit the metallic patterns onto the plastic substrate by conventional printed circuit photo-etching techniques.

For the embodiment of FIGS. 3 through 6 the metallic patterns 40 on strips 38 and 44 on strips 42 are positioned to extend from an electrode bar on the surface of a given solar cell to substantially the middle of the preceeding solar cell. For example, referring to the strip 38 in FIGS. 4 and 6, one end of a region 40 begins substantially at the middle of the bottom surface of solar cell 30 and extends to and makes contact with the electrode bar 54 at the top surface of solar cell 48. The strip 38 continues across the top surface of solar cell 48, unmetallized, and the next metallic region 40 does not begin until the strip reaches substantially the middle of the bottom of the solar cell forming unit 35. The metallic regions are on the surface of the strips facing downward with respect to the solar cells and thus come in direct contact with the bar electrodes on the top surfaces but do not come into contact with the bottom surfaces of solar cells. Electrical contact to the bottom surfaces is made by means of metallic strips such as those shown at 46 and 56. As best seen in FIG. 5 the metallic strip 46 not only connects the metallic regions 40 on the plastic strips 38 to the bottom surface of solar cell 30 but also interconnects all of the solar cells in the same column. Additional strips in the other columns perform the same function. It can be seen that while the strips 38 with metallic regions 40 serially interconnect the solar cell of unit 33 with that of unit 31, the strips 42 with metallic regions 44 serially interconnect the solar cell of unit 35 with that of unit 33. The array is completed by placing a glass filter 34 on the top surface of the solar cells by means of adhesive 32. The glass filter may be designed to protect the adhesive and the plastic strips from harmful radiation.

Figure 8:
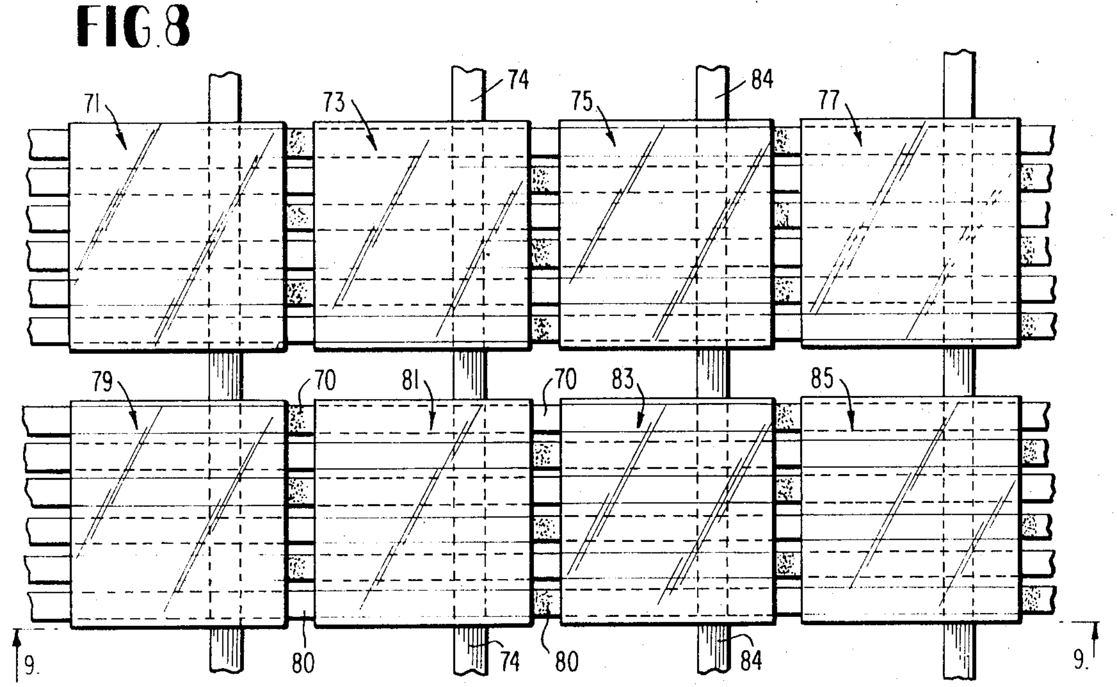
FIGS. 8 and 9 illustrate top and side views respectively of a second embodiment of the present invention.
Figure 9:
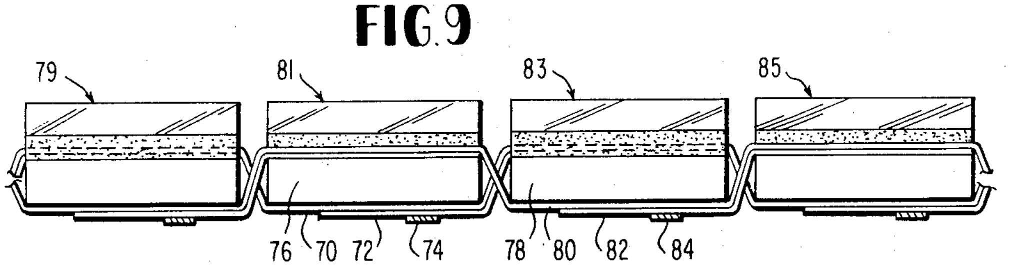
Figure 10:
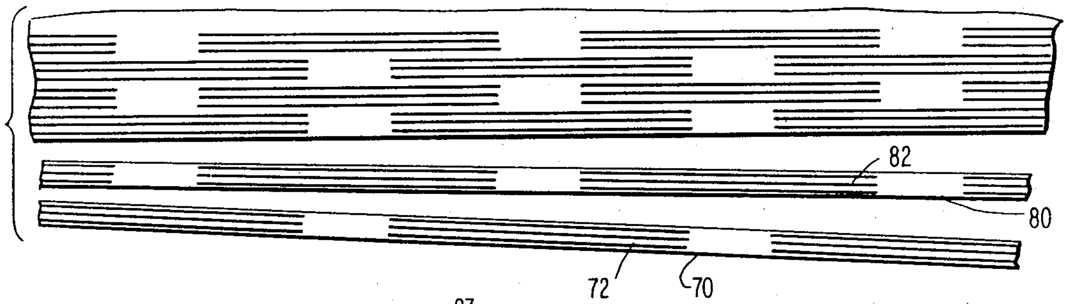
FIG. 10 illustrates a second metallic pattern which may be used on the flexible strips in connection with the second embodiment.
Figure 11B:
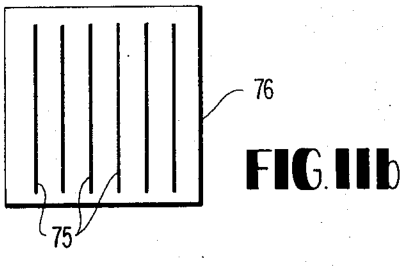

An alternative embodiment shown in FIGS. 8 and 9, with strips illustrated separately in FIG. 10, differs from the first embodiment primarily in that the bar electrodes on the upper surfaces of the solar cells are eliminated and the metallic region on the flexible non-conducting strips perform a direct electrical connection with the upper surface of the solar cells. The second embodiment is preferably used with solar cells having a conductive surface pattern of the type illustrated in FIG. 11*b*, although as will be apparent, cells having other conductive patterns on their surfaces may also be used. The cell 76 is positioned so that the flexible strips of FIG. 10 cross the conductive fingers 76 on the surface thereof. The portion of the array illustrated comprises units 71 through 85. Although the metallic pattern 72 and 82 on the strips 70 and 80 respectively are shown as comprising straight thin lines, it should be understood that the straight line pattern or the daimond pattern, shown in FIG. 7, may be used for either the first or second embodiment. One difference is that for the second embodiment the regions of metallic patterns must be longer. This is so because in the second embodiment the metallic pattern extends all the way across the top surface of the solar cell and down to substantially the middle of the bottom surface of the preceeding solar cell. As seen in FIG. 9, the metallic region 72 on strip 70 extends from substantially the middle of the bottom surface of solar cell 76 up to and completely across the top surface of solar cell 78. The metallic strip connectors are illustrated at 74 and 84 and serve the same purpose as in the first embodiment.

Both of the above-described embodiments result in an improved flexible solar cell array. When the array is bent, folded, or rolled up, it will bend at the hinges formed by the plastic strips. There is no bulky radius of adhesive and substrate to bend around. The cells are also held together by the woven strips, which in effect acts as a substrate, and despite the fact that the substrate is slit into long strips, it still has its mechanical tensile strength. Tension does not put any strain on the interconnector since when the tension is applied the only force that the cells evidence is compressive force caused by the tendency of the strips of plastic to come together. A further novel and unique feature of the interconnector-substrate system is the fact that an extra layer of adhesive is eliminated; that is, the adhesive layer previously used to attach the bottoms of the cells to the substrate is no longer necessary, since the substrate comprises the plastic strips and is adhered to the solar cell by the glass slip adhesive on the top surface and by the metal strips on the bottom surfaces. The latter strips may be joined to the metallic regions by means of soldering or welding.

A further advantage of the invention is that now the cells can be stacked one on top of the other. There is no adhesive and substrate to bend around, and the packaged cell stack, which is, for instance, 1 inch wide and 1 inch thick, will deploy into an array which is 20 inches long, giving a 20 to 1 packing ratio.

What is claimed is:

1. A solar cell assembly comprising, a. a row of individual solar cells, each having top and bottom surfaces b. first and second flexible strips of non-conducting material, each having a conductive material on the surface thereof forming periodically positioned electrically conductive regions thereon c. said flexible strips being interwoven through said row of solar cells to mechanically hold said cells together and provide series electrical connection from the top surface of each cell to the bottom surface of a preceeding cell in said row.

2. The assembly as claimed in claim 1, wherein said first strip overlies every other cell in said row and underlies the remaining cells in said row, and said second strip overlies and underlies said cells in opposite order, the top surface of each said cell electrically contacting one of said conductive regions on the strip overlying said cell, said one conductive region extending along said strip in a continuous conductive path to the bottom surface of the preceeding cell.

3. A solar cell assembly comprising a row of individual solar cells having top and bottom surfaces, a plurality of strips of flexible non-conducting material, each of said strips having a plurality of electrically conductive regions on a single surface, each of said regions being spaced periodically along said strip and separated by lengths of said strip having no conductive coatings thereon, at least one of said strips interwoven among said row of cells in a manner to position said regions face down with every odd cell in said row having one end of a region on said upper surface and electrically contacted thereto, and the other end of said region extending to the bottom surface of the preceeding cell, at least one of said strips interwoven among said row of cells in a reverse manner to position said regions face down with every even cell in said row having one end of a region on said upper surface and electrically contacted thereto, and the other end of said region extending to the bottom surface of the preceeding cell, and electrically conductive strip members, one for each cell in said row, each said conductive strip member connecting the bottom surface of one cell to the end of said region which extends to the bottom surface of said one cell.

4. A solar cell assembly as claimed in claim 3 further comprising a plurality of additional rows of solar cells, each of said rows interwoven and held by at least two oppositely woven non-conductive flexible strips having conductive regions thereon the same as for said first row, and wherein each of said conductive metal strips extends across the bottom of a corresponding cell in each row connecting together the bottom surfaces of said corresponding cells and the conductive regions on the portions of said flexible strips which underlie said corresponding cells, all of the rows of cells being a matrix of solar cells with each of said metal strips defining a parallel connected column of cells.

5. A solar cell assembly as claimed in claim 4 wherein each of said cells has a bar electrode attached to one edge of the upper surface thereof perpendicular to the direction of weave of said flexible strips, and wherein said regions of conductive material are electrically connected at one end thereof to said bar electrode, the other end extending substantially past the nearest bottom surface edge of the preceeding adjacent cell and terminating prior to the opposite bottom surface edge of said preceeding adjacent cell.

6. A solar cell assembly as claimed in claim 4 wherein said regions of conductive material which overlie said cells extend substantially completely across and directly contact the upper surfaces of said cells in the direction of said weave of flexible strips.

7. A solar cell assembly as claimed in claim 5 further comprising additional identical non-conducting flexible strips with regions of conductive material thereon woven through and contacting each row of cells in the same manner as said prior mentioned non-conducting flexible strips.

8. A solar cell assembly as claimed in claim 6 further comprising additional identical non-conducting flexible strips with regions of conductive material thereon woven through and contacting each row of cells in the same manner as said prior mentioned non-conducting flexible strips.

9. A solar cell assembly as claimed in claim 8 further comprising glass filter attached to the upper surfaces of said cells by an adhesive.

* * * * *

UNITED STATES PATENT OFFICE
CERTIFICATE OF CORRECTION

Patent No. 3,819,417 Dated June 25, 1974

Inventor(s) Joseph G. Haynos

It is certified that error appears in the above-identified patent and that said Letters Patent are hereby corrected as shown below:

IN THE SPECIFICATION:

Column 2, line 48 - after "such as" insert -- a --

Column 4, line 6 - "daimond" should be --diamond--

Signed and sealed this 29th day of October 1974.

(SEAL)
Attest:

McCOY M. GIBSON JR.
Attesting Officer

C. MARSHALL DANN
Commissioner of Patents